United States Patent Office 3,498,934
Patented Mar. 3, 1970

3,498,934
CHLORINATED POLYETHYLENE FOAM
William C. Kraemer, Jr., Cranford, Carl R. Eckardt, Morris Plains, N.J., assignors, by mesne assignments, The Dow Chemical Company, Midland, Mich., a corporation of Delaware
No Drawing. Filed Mar. 29, 1965, Ser. No. 443,618
The portion of the term of the patent subsequent to Aug. 8, 1984, has been disclaimed
Int. Cl. C08f 47/10, 27/03
U.S. Cl. 260—2.5                              1 Claim

ABSTRACT OF THE DISCLOSURE

A resilient, semi-rigid, nonflammable foam having an ultimate elongation of at least 40% and a density ranging from about 1 to about 20 lbs./cu. ft., comprises chlorinated polyethylene having an intrinsic viscosity ranging from about 0.2 to about 5.0 deciliters/gram in o-dichlorobenzene at 100° C., and a chlorine content of 60% to 65% by weight.

---

This invention relates to chlorinated polyethylene foam and the preparation thereof. More particularly, this invention relates to resilient semi-rigid foam composed of chlorinated polyethylene having a chlorine content of about 60 to 65% by weight.

In our copending United States patent application Ser. No. 328,520, filed Dec. 6, 1963, now Patent No. 3,335,-101, there are disclosed rigid closed-cell foams composed composed of chlorinated polyethylene having a chlorine content of at least 66% by weight. While these foams are excellent in some applications such as insulation panels, they cannot be employed where a resilient material is required. Because of the outstanding properties of chlorinated polyethylene, it is highly desirable that a resilient foam be produced from this resin.

The present invention provides novel resilient foams of chlorinated polyethylene which are nonflammable and have good abrasion and impact resistance. The properties of these foams make them outstanding for such uses as padded dashboards or other crash pads, arm rests, upholstery, and packaging.

It is, therefore, an object of the present invention to provide novel chlorinated polyethylene foams and methods for their preparation.

Another object of this invention is to provide chlorinated polyethylene foams which are resilient.

Additional objects and advantages of this invention will become apparent from the following detailed description thereof.

In accordance with the presented invention, it has been discovered that a resilient, semi-rigid foam of outstanding properties can be prepared from chlorinated polyethylene having a chlorine content of 60 to 65% by weight. These polymers are nonflammable and have a high resistance to abrasion and impact.

The foams of the present invention are prepared by absorbing a liquefied blowing agent in chlorinated polyethylene and then expanding the blowing agent into a gas, thereby forming cells within the polymer. For best results the chlorinated polyethylene is impregnated with blowing agent at an elevated temperature under sufficient pressure to maintain the blowing agent in at least a partially liquefied state and then the chlorinated polyethylene is either directly foamed by releasing the pressure at a temperature above the boiling point of the blowing agent, or the impregnated chlorinated polyethylene is cooled below the boiling point of the blowing agent before the environmental pressure is released to thereby give a noncellular product which can be subsequently foamed by expanding the blowing agent.

In a preferred process, particles of chlorinated polyethylene are placed in a pressure vessel which is either rotatable so as to impart a tumbling motion to said particles or equipped with mixing means, and a liquefied blowing agent is introduced into the vessel. The vessel is then heated to a temperature in the range of 60–100° C., but not exceeding th melting point of the polymer, under sufficient pressure to maintain a substantial portion of the blowing agent in liquefied state. The chlorinated polyethylene particles are then mixed with blowing agent until the desired amount of blowing agent has been absorbed by the particles. The agitation during absorption step should be sufficient to prevent agglomeration of the particles, the above-described tumbling of the particles being particularly effective in this respect. In preventing agglomeration, it is also important not to exceed the melting point of the polymer. After absorption of the blowing agent the particles are cooled below the boiling point of the blowing agent at atmospheric pressure, the pressure in the vessel is reduced to atmospheric and the impregnated particles removed from the vessel in an unexpanded state. In practice we have used spherical particles having diameters of about $\frac{1}{16}$ to $\frac{1}{8}$ of an inch. However, the particles can be larger or smaller and can be cylindrical or any other desired shape.

The chlorinated polyethylene particles impregnated with blowing agent by the absorption process may be made into foam in a number of ways. In one preferred process the particles are fed through an extruder in which the extrusion cylinder and/or stock screw are equipped with heating means and as the chlorinated polyethylene is advanced through the extrusion cylinder it is converted to a viscous melt having a temperature above the boiling point of the blowing agent absorbed therein. While the chlorinated polyethylene is confined within the extrusion cylinder, the blowing agent cannot expand and heating the blowing agent above its boiling point generates high pressures within the extruder. When the hot chlorinated polyethylene composition is forced through the extruder head into a zone of lower pressure, the blowing agent expands the resin forming a continuous log of chlorinated polyethylene foam. The size and shape of this log are of course a function of the extruder die.

Another method of preparing the cellular product from the above-described expandable chlorinated polyethylene particles is by molding. A convenient means of accomplishing this is to partially fill a mold having gas escape openings with a sufficient quantity of expandable particles to fill the mold after foaming. The particles are placed in the mold and then are heated to a temperature above the boiling point of the blowing agent absorbed therein and above the softening point of the chlorinated polyethylene to thereby expand the particles and form a cellular product having the shape of the mold. The mold is then cooled prior to removal of the molded product.

If desired, a foam product can be extruded directly from chlorinated polyethylene without the intermediate step of preparing expandable particles. To directly extrude chlorinated polyethylene foam, a blowing agent is injected into melted chlorinated polyethylene as the melt is being advanced through the extrusion cylinder, and the resulting mixture is forced through the extrusion die into a zone of lower pressure, whereupon with the resulting drop in pressure the blowing agent expands forming a cellular product.

Chlorinated polyethylene suitable for use in the present invention can be prepared by chlorinating either high pressure (branched) or low pressure (high density, essentially linear) polyethylene to a chlorine content of 60 to 65%. The molecular weight of the polyethylene can be varied according to the desired properties of the final product. However, when the polyethylene employed has a molecular weight of less than about 40,000, the tensile and impact strengths of the foam product are rather low. If the foam is to be made by an extrusion technique, it is best not to exceed a molecular weight of about 2,000,000 in order to avoid processing difficulties. Polyethylene having a molecular weight of up to about 5,000,000 can be used if the foam is to be prepared by a molding process. As is well known in the art, the molecular weight of the polymer can be controlled by the selection of the polymerization process used and by varying the conditions and reaction times utilized with a particular polymerization technique. Since high density, essentially linear polyethylenes having molecular weights of 40,000 and up are much more readily prepared than branched polyethylenes of such molecular weights, it is preferable to use an essentially linear polyethylene.

These essentially linear polyethylenes have densities of about 0.935 to 0.985 gms./cm.$^3$ at 20° C. and can be produced by any of the conventional low pressure ethylene polymerization processes. One procedure, which has given particularly good results, is to carry out a gas phase polymerization in the presence of a supported chromium activated catalyst in the manner set forth in British Patent 858,674, issued Jan. 11, 1961, to produce a linear polyethylene having a very high molecular weight and then to partially depolymerize the polymer to the desired molecular weight by the thermal degradation process described in this British patent.

The chlorination of the polyethylene can be conducted in accordance with any of the known solution or slurry chlorination procedures capable of chlorinated polyethylene to a chlorine content of 60 to 65% by weight. A suitable chlorination technique is set forth in French Patent 1,316,044 issued Dec. 17, 1962.

The viscosity of the chlorinated polyethylene employed varies with the molecular weight of the polyethylene which is chlorinated. The foams of the present invention can be produced from chlorinated polyethylene having an intrinsic viscosity of about 0.2 to 5.0 deciliters/gram in o-dichlorobenzene at 100° C. If the foam is to be produced by extrusion, the chlorinated polyethylene should preferably have an intrinsic viscosity of not more than about 3.5 for ease in processing. On the other hand, it is recommended that the chlorinated polyethylene used have an intrinsic viscosity of at least least 0.4 in order to obtain satisfactory physical properties.

The blowing agent may be any suitable compound inert to the chlorinated polyethylene which will gasify or vaporize during processing. Useful blowing agents include chlorinated aliphatic compounds of 1 to 4 carbon atoms such as methyl chloride, methylene dichloride, ethyl chloride, ethylene dichloride, and n-propyl chloride; and chlorofluoroalkanes of 1 to 2 carbon atoms such as trichloromonofluoromethane, dichlorodifluoromethane, dichlorofluoromethane, monochlorodifluoromethane, trichlorotrifluoroethane, dichlorotetrafluoroethane and chlorotrifluoroethane. Additionally, volatile hydrocarbons such as pentane and hexane and ethers such as ethyl ether and diisopropyl ether can be used as foaming agents, but these compounds are not the preferred agents. Although the blowing agent can be used in an amount of about 5 to 50%, it is preferred to have a quantity of blowing agent from about 15 to 30% by weight of the chlorinated polyethylene absorbed in the chlorinated polyethylene at the commencement of the foaming procedure. If the chlorinated polyethylene is stored in unexpanded form for any length of time after impregnation with the blowing agent, an excess of blowing agent should be initially absorbed to allow for losses.

Another feature of the chlorinated polyethylene is that any scrap material resulting from its use can be chopped up, reimpregnated with blowing agent, and reextruded to form new cellular logs. This offers an important advantage over other rigid foams, particularly polyurethane foam which cannot be readily reprocessed.

The foams of this invention have excellent impact resistance and abrasion resistance which are considerably higher than those of polyurethane and polystyrene foams. The superior abrasion resistance not only increases the wearing properties but greatly reduces the amount of dust formed on cutting of the cellular product.

It is not essential to incorporate a stabilizer in the foamed material. However, when a foam is produced by means of extrusion, it is preferred to include a stabilizer in the expandable composition in case of exposure to excess or prolonged heating as a result of malfunctioning of the apparatus. Suitable stabilizers which may be incorporated into the chlorinated polyethylene compositions are blends including antioxidants such as 2,6-ditert.butyl-4-methylphenol, HCl acceptors such as epoxy stabilizers, and thermal stabilizers such as pentaerythritol.

The foamed product of the present invention has a predominantly closed cell structure, i.e., at least 70% and preferably at least 80% of the cells are closed. This predominantly closed cell structure both contributes to the physical strength of the foam and makes possible the retention of low thermal conductivity gases in the foam. The density of the foams can be varied from about 1 lb./cu. ft. up to a density only slightly less than that of the unfoamed polymer from which it is prepared. However, since the cost of a given volume of foam is largely dependent upon the amount of resin contained therein, for most applications it is not practical to exceed a density of 20 lbs./cu. ft. with a maximum density of 10 lbs./cu. ft. being preferred.

The following examples are given to further illustrate the invention, but it is to be understood that the invention is not to be limited in any way by the details described therein. In the examples the parts are by weight.

EXAMPLE 1

The chlorinated polyethylene resin used in this example was prepared by the aqueous slurry chlorination of linear polyethylene and had a chlorine content of 60.5% and an intrinsic viscosity of 1.0 in o-dichlorobenzene at 100° C. The chlorinated polyethylene resin was obtained from the chlorination process in the form of aggregates having a diameter of about ⅛ inch. One hundred parts of this aggregate were blended with a stabilizing system consisting of one part of 2,6-di-tert.butyl-4-methyl phenol, one part pentaerythritol, and three parts of an epoxide stabilizer of the formula

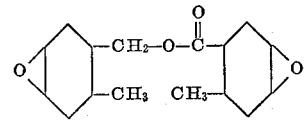

A nucleating agent consisting of ½ part of silica having a submicron particle size was then coated on the surface of the aggregates. The resulting composition was placed in a rotatable pressure vessel and a quantity of liquid trichloromonofluoromethane equal to 25% by weight of the resin was added. The above composition and the trichloromonofluoromethane were admixed in the pressure vessel by tumbling for 16 hours at a temperature of 70° C., the pressure vessel being sealed so that a substantial portion of the blowing agent was maintained in liquid phase by the generated pressure. The pressure vessel was cooled to 10° C. and then opened. The chlorinated polyethylene particles were found to have absorbed 23 parts of the trichloromonofluoromethane per 100 parts of resin.

The impregnated resin was extruded through a ⅛ inch by ¾ inch tape die on a 1-inch extruder having a length/diameter ratio of 20:1. The extruder had four heating zones and was equipped with a square pitch 1.35:1 compression ratio screw of constant taper. During the extrusion, the three rear zones of the extruder were unheated; the front zone was heated to 80° C. and the tape die was heated to 95° C. The screw speed was 60 r.p.m. A resilient white foam was obtained having a density of 1.75 lbs./cu. ft. (ASTM Test D–1622), an ultimate tensile strength of 51 p.s.i. (ASTM Test D–1623), an ultimate elongation of 82% (ASTM Test D–1623). The compression properties of the foam, determined in accordance with ASTM Test D–1621, are as follows:

| | Percent |
|---|---|
| Deformation, 11.5 p.s.i. | 10 |
| Deformation, 22,9 p.s.i. | 50 |
| Percent recovery from deformation, 88.1% | 50 |

EXAMPLE 2

The chlorinated polyethylene resin used in this example was prepared by the aqueous slurry chlorination of linear polyethylene. It had a chlorine content of 65% and an intrinsic viscosity of 1.0 in o-dichlorobenzene at 100° C. After chlorination, the resin was in the form of small aggregates of $\frac{1}{16}''-\frac{1}{8}''$ diameter. The resin was mixed with stabilizer and nucleating agent in the same manner as described in Example 1. The resulting composition was placed in a rotatable pressure vessel and a quantity of liquid trichloromonofluoromethane equal to 40% by weight of the resin was added. The above composition in trichloromonofluoromethane was admixed in the pressure vessel by tumbling for 16 hours at 70° C., after which the vessel was cooled to 10° C. and then resin particles were removed.

The chlorinated polyethylene was fed through the extruder described in Example 1, employing a barrel temperature profile of 50°, 80°, 110°, and 125° C. and a die temperature of 125° C. A white foam was obtained having a density of 2.5 lbs./cu. ft., an ultimate tensile strength of 50 p.s.i. and an ultimate elongation of 46%. The compression properties of the foam are as follows:

| | Percent |
|---|---|
| Deformation, 34 p.s.i. | 50 |
| Percent recovery from deformation, 93.8% | 50 |

EXAMPLE 3

A 375-gram charge of trichloromonofluoromethane-impregnated chlorinated polyethylene prepared as in Example 2 is placed in a 12″ x 12″ x 1″ mold having outlets to allow the escape of gas. The mold is heated at a temperature of 125° C. until the particles of resin expand to give a board having the shape of the mold.

EXAMPLE 4

A 1″ extruder of the type employed in Example 1 is equipped with an inlet pipe for the injection of blowing agent between the resin feed port and the die. The heaters of the extrusion barrel and die are adjusted to give the same temperature as used in Example 2. Particles of chlorinated polyethylene having a chlorine content of 65% and an intrinsic viscosity of 1.0 in o-dichlorobenzene at 100° C. are fed through the extruder and a high-pressure positive displacement pump is used to inject ethyl chloride into the mill at 2000 p.s.i.g. A foamed board is produced which is similar to that obtained in Example 2.

The foams of the present invention are more flexible and resilient than chlorinated foams containing more than 65% by weight of chlorine and are characterized by an ultimate elongation of at least 40%. To compare the resiliency and flexibility of the foams of this invention with foams of higher chlorine content, chlorinated polyethylene foams were prepared from resins of 68% and 71% chlorine content following the general procedure outlined in Examples 1 and 2. A comparison of the ultimate elongation and the recovery from 50% deformation is given in the following table:

| Resin Percent Chlorine | Ultimate Elongation, Percent | Percent Recovery From 50% Deformation |
|---|---|---|
| 60 | 82 | 82.4 |
| 65 | 46 | 93.8 |
| 68 | 14 | 70.5 |
| 71 | 12 | 70.0 |

It will be apparent that many modifications and variations can be effected without departing from the scope of the novel concepts of the present invention, and the illustrative details disclosed are not to be construed as imposing undue limitations on the inventions.

We claim:

1. A semi-rigid, nonflammable foam comprising chlorinated polyethylene having an intrinsic viscosity of between about 0.2 to 5.0 deciliters per gram in o-dichlorobenzene at 100° C. and a chlorine content of 60 to 65 percent by weight wherein said foam has an ultimate elongation of at least 40 percent, a density of from about 1 to 20 pounds per cubic foot and at least about an 82.4 percent recovery from a 50 percent deformation when containing 60 percent by weight chlorine and up to about 93.8 percent recovery from a 50 percent deformation when said foam contains 65 percent by weight chlorine.

References Cited

UNITED STATES PATENTS

| 2,183,556 | 12/1939 | Fawcett. | |
| 2,387,730 | 10/1945 | Alderson. | |
| 3,398,803 | 4/1946 | Myles et al. | |
| 2,628,945 | 2/1953 | Wayne | 260—2.5 |
| 3,067,147 | 12/1962 | Rubens et al. | |
| 2,398,803 | 4/1946 | Myles et al. | |
| 3,335,101 | 8/1967 | Kraemer et al. | 260—2.5 |

FOREIGN PATENTS

| 828,938 | 2/1960 | Great Britain. |

MURRAY TILLMAN, Primary Examiner

J. C. BLEUTGE, Assistant Examiner

U.S. Cl. X.R.

260—33.2, 33.4, 33.6, 33.8, 45.8, 45.95, 94.9, 836; 264—53